(12) United States Patent
Ameen (10) Patent No.: US 10,557,345 B2
(45) Date of Patent: Feb. 11, 2020

(54) SYSTEMS AND METHODS TO PREDICT AND INHIBIT BROKEN-OUT DRILLING-INDUCED FRACTURES IN HYDROCARBON WELLS

(71) Applicant: Saudi Arabian Oil Company, Dhahran (SA)

(72) Inventor: Mohammed S. Ameen, London (GB)

(73) Assignee: Saudi Arabian Oil Company, Dhahran (SA)

(*) Notice: Subject to any disclaimer, the term of this patent is extended or adjusted under 35 U.S.C. 154(b) by 97 days.

(21) Appl. No.: 15/985,290

(22) Filed: May 21, 2018

(65) Prior Publication Data

US 2019/0353033 A1   Nov. 21, 2019

(51) Int. Cl.
  *E21B 49/00* (2006.01)
  *E21B 47/00* (2012.01)
  *G01V 99/00* (2009.01)

(52) U.S. Cl.
  CPC .......... *E21B 49/006* (2013.01); *E21B 49/003* (2013.01); *E21B 49/008* (2013.01); *G01V 99/005* (2013.01)

(58) Field of Classification Search
  CPC ......... E21B 49/006; E21B 47/00; E21B 49/00
  See application file for complete search history.

(56) References Cited

U.S. PATENT DOCUMENTS

| | | | |
|---|---|---|---|
| 3,586,105 A | 6/1971 | Johnson et al. | |
| 3,739,781 A | 6/1973 | Patel | |
| 3,796,091 A | 3/1974 | Serata | |

(Continued)

FOREIGN PATENT DOCUMENTS

| | | |
|---|---|---|
| CN | 103389247 A | 11/2013 |
| CN | 103472498 A | 12/2013 |

(Continued)

OTHER PUBLICATIONS

Ameen, Mohammed S.; "Fracture and in-situ stress patterns and impact on performance in the khuff structural prospects, eastern offshore Saudi Arabia", Marine and Petroleum Geology, 2014; pp. 166-184.

(Continued)

*Primary Examiner* — Catherine Loikith
(74) *Attorney, Agent, or Firm* — Bracewell LLP; Constance G. Rhebergen; Christopher L. Drymalla (57) ABSTRACT

Determining that a minimum circumferential hoop stress ($\sigma\theta\theta^{MIN}$) of a wellbore drilled into a subsurface formation is less than or equal to a tensile strength ($T_o$) of formation rock in the wellbore; determining that a lamination density ($D_L$) of the formation rock is greater than a threshold lamination density ($D_{L thres}$); determining that a composition of the formation rock is a clay rich laminate; determining that a linear swelling ratio (LSR) of the formation rock is within a specified range; and in response to the determinations, operating the well to inhibit the occurrence of broken-out drilling-induced fractures (BODIFs).

25 Claims, 4 Drawing Sheets

(56) References Cited

U.S. PATENT DOCUMENTS

| | | |
|---|---|---|
| 3,992,928 A | 11/1976 | Thoms |
| 4,005,750 A | 2/1977 | Shuck |
| 4,044,828 A | 8/1977 | Jones et al. |
| 4,109,717 A | 8/1978 | Cooke, Jr. |
| 4,254,828 A | 3/1981 | Sowa et al. |
| 4,291,581 A | 9/1981 | Jacoby |
| 4,340,934 A | 7/1982 | Segesman |
| 4,393,933 A | 7/1983 | Nolte et al. |
| 4,453,595 A | 6/1984 | Lagus et al. |
| 4,695,957 A | 9/1987 | Peltier |
| 4,710,906 A | 12/1987 | Bradley et al. |
| 4,794,534 A | 12/1988 | Millheim |
| 4,879,654 A | 11/1989 | Bruce |
| 5,050,690 A | 9/1991 | Smith |
| 5,165,276 A | 11/1992 | Thiercelin |
| 5,295,393 A | 3/1994 | Thiercelin |
| 5,417,116 A | 5/1995 | Solomon et al. |
| 5,743,334 A | 4/1998 | Nelson |
| 5,838,634 A | 11/1998 | Jones et al. |
| 5,895,437 A | 4/1999 | Di Cesare et al. |
| 5,995,446 A | 11/1999 | Meyer et al. |
| 6,009,747 A | 1/2000 | Dos Santos |
| 6,151,961 A | 11/2000 | Huber et al. |
| 6,170,440 B1 | 1/2001 | Monnier et al. |
| 6,173,773 B1 | 1/2001 | Almaguer et al. |
| 6,256,603 B1 | 7/2001 | Celniker |
| 6,408,953 B1 | 6/2002 | Goldman et al. |
| 6,549,854 B1 | 4/2003 | Malinverno et al. |
| 6,609,067 B2 | 8/2003 | Tare et al. |
| 6,766,254 B1 | 7/2004 | Bradford et al. |
| 6,832,158 B2 | 12/2004 | Mese et al. |
| 6,834,233 B2 | 12/2004 | Economides et al. |
| 8,126,689 B2 | 2/2012 | Soliman et al. |
| 8,146,416 B2 | 4/2012 | Pisio et al. |
| 8,374,836 B2 | 2/2013 | Yogeswaren |
| 8,600,716 B2 | 12/2013 | Bradford |
| 8,736,263 B2 | 5/2014 | Minh |
| 8,991,520 B2 | 3/2015 | Kulkarni et al. |
| 9,411,071 B2 | 8/2016 | Gray et al. |
| 9,646,115 B2 | 5/2017 | Frydman |
| 9,719,332 B2 | 8/2017 | Zamora et al. |
| 2002/0010548 A1 | 1/2002 | Tare et al. |
| 2003/0150263 A1 | 8/2003 | Economides et al. |
| 2003/0168257 A1 | 9/2003 | Aldred et al. |
| 2003/0212495 A1 | 11/2003 | Mese et al. |
| 2004/0122640 A1 | 6/2004 | Dusterhoft |
| 2004/0176911 A1 | 9/2004 | Bratton et al. |
| 2005/0113262 A1 | 5/2005 | Ravi et al. |
| 2005/0161262 A1 | 7/2005 | Jamison |
| 2006/0153005 A1 | 7/2006 | Herwanger et al. |
| 2006/0285437 A1 | 12/2006 | Sinha et al. |
| 2007/0027036 A1 | 2/2007 | Polizzotti et al. |
| 2007/0289741 A1 | 12/2007 | Rambow |
| 2007/0294034 A1 | 12/2007 | Bratton et al. |
| 2008/0190190 A1 | 8/2008 | Tan et al. |
| 2008/0319675 A1 | 12/2008 | Sayers |
| 2009/0070043 A1 | 3/2009 | Ryu et al. |
| 2009/0132218 A1 | 5/2009 | Ledgerwood, III |
| 2009/0151937 A1 | 6/2009 | Goodwin et al. |
| 2009/0163388 A1 | 6/2009 | Reddy et al. |
| 2010/0155142 A1 | 6/2010 | Thambynayagam et al. |
| 2010/0243328 A1 | 9/2010 | Rodriguez Herrera |
| 2011/0125333 A1 | 5/2011 | Gray |
| 2011/0153296 A1 | 6/2011 | Sadlier et al. |
| 2011/0198076 A1 | 8/2011 | Villreal |
| 2013/0138410 A1 | 5/2013 | Yogeswaren |
| 2013/0275099 A1 | 10/2013 | Frydman |
| 2014/0326449 A1 | 11/2014 | Samuel et al. |
| 2015/0090498 A1 | 4/2015 | Hareland |
| 2015/0168597 A1 | 6/2015 | Bai |
| 2016/0033382 A1 | 2/2016 | Jamison et al. |
| 2017/0009575 A1 | 1/2017 | Liu et al. |
| 2017/0145793 A1 | 5/2017 | Ouenes |
| 2017/0267909 A1 | 9/2017 | Jin et al. |
| 2017/0362935 A1* | 12/2017 | Batmaz ............... E21B 49/006 |

FOREIGN PATENT DOCUMENTS

| | | |
|---|---|---|
| CN | 104594867 A | 5/2015 |
| EP | 0527089 A2 | 2/1993 |
| WO | WO199727502 A1 | 7/1997 |
| WO | WO2008098031 A1 | 8/2008 |
| WO | WO2008147762 A1 | 12/2008 |
| WO | WO2010093533 A2 | 8/2010 |

OTHER PUBLICATIONS

International Search Report and Written Opinion for related PCT application PCT/US2019/032795 dated Jul. 25, 2019.

Bell, J.S. and Gough, D.I.; "Northeast-southwest compressive stress in Alberta: evidence from oil wells" Earth and Planetary Science Letters, 45 (1979), pp. 475-482.

Dart, Richard L. et al.; "Principal Stress Directions on the Atlantic Continental Shelf Inferred from the Orientations of Borehole Elongations" U.S. Geological Survey Open-File Report 87-283 1987; pp. 1-45.

Dart, Richard L. et al.; "Wellbore Breakout Stress Analysis Within the Central and Eastern Continental United States" The Log Analyst Jan.-Feb. 1989; pp. 12-25.

Dart, Richard L.; "In Situ Stress Analysis of Wellbore Breakouts from Oklahoma and the Texas Panhandle" U.S. Geological Survey Bulletin 1866, Chapter F, pp. 1-34.

Dart, Richard L.; "South-central United States Well-Bore Breakout-Data Catalog" U.S. Geological Survey Open-File Report 87-405 1987, pp. 1-98.

Hickman, Stephen H. et al.; "In Situ Stress, Natural Fracture Distribution, and Borehole Elongation in the Auburn Geothermal Well, Auburn, New York" Journal of Geophysical Research, vol. 90, No. B7, Jun. 10, 1985; pp. 5497-5512.

Morin, Roger H. et al.; "State of Lithospheric Stress and Borehole Stability at Deep Sea Drilling Project Site 504B, Eastern Equatorial Pacific" Journal of Geophysical Research, vol. 95, No. B6, Jun. 10, 1990; pp. 9293-9303.

Barton, Colleen A. et al.; "In-Situ Stress Orientation and Magnitude at the Fenton Geothermal Site, New Mexico, Determined from Wellbore Breakouts" Geophysical Research Letters, v. 15, No. 5; pp. 467-470

Gough, D.I. and Bell, J.S.; "Stress orientations from oil-well fractures in Alberta and Texas" Can. J. Earth Sci. vol. 18, 1981; pp. 638-645.

Haimson, B.C. and Herrick, C.G.; "Borehole breakouts—a new tool for estimating in situ stress?" Proceedings of the International Sumposium on Rock Stress and Rock Stress Measurements, Stockholm, Sep. 1-3, 1986; pp. 271-280.

Haimson, B.C. and Song, I.; "Laboratory Study of Borehole Breakouts in Cordova Cream: A Case of Shear Failure Mechanism" Int. J. Rock Mech. Min. Scie. & Geomech., 1993, Abstr. vol. 30, No. 7; pp. 1047-1056.

Marinos, Paul and Hoek, Evert; "GSI: A Geologically Friendly Tool for Rock Mass Strength Estimation" ISRM-IS-2000-035, International Society for Rock Mechanics and Rock Engineering, ISRM Symposium, Nov. 19-24, 2000; pp. 1-19.

Zheng, Zigiong et al.; "Analysis of Borehole Breakouts" Journal of Geophysical Research, vol. 94, No. B6, Jun. 10, 1989; pp. 7171-7182.

Zoback, Mark D. et al.; "Well Bore Breakouts and in Situ Stress" Journal of Geophysical Research, vol. 90, No. B7, Jun. 10, 1985; pp. 5523-5530.

Ameen et al., "Predicting rock mechanical properties of carbonates from wireline logs (A case study: Arab-D reservoir, Ghawar field Saudi Arabia).", Marine and Petroleum Geology, 2009, pp. 430-444, Elsevier.

International Search Report and Written Opinion for related PCT application PCT/US2019/041235 dated Oct. 1, 2019.

Prioul et al., "Forward modeling of fracture-induced sonic anisotropy using a combination of borehole image and sonic logs.", Geophys- (56) References Cited

OTHER PUBLICATIONS ics, 2007, pp. E135-E147, vol. 71, No. 4, Society of Exploration Geophysicists.

* cited by examiner

SYSTEMS AND METHODS TO PREDICT AND INHIBIT BROKEN-OUT DRILLING-INDUCED FRACTURES IN HYDROCARBON WELLS

FIELD

Embodiments relate generally to developing wells, and more particularly to operating hydrocarbons wells to inhibit broken-out drilling-induced fractures.

BACKGROUND

A well generally includes a wellbore (or "borehole") that is drilled into the earth to provide access to a geologic formation below the earth's surface (or "subsurface formation"). The well may facilitate the extraction of natural resources, such as hydrocarbons and water, from the subsurface formation, facilitate the injection of substances into the subsurface formation, or facilitate the evaluation and monitoring of the subsurface formation. In the petroleum industry, hydrocarbon wells are often drilled to extract (or "produce") hydrocarbons, such as oil and gas, from subsurface formations. The term "oil well" is often used to refer to a well designed to produce oil. Similarly the term "gas well" is often used to refer to a well designed to produce gas. In the case of an oil well, some natural gas is typically produced along with oil. A well producing both oil and natural gas is sometimes referred to as a "oil and gas well" or an "oil well." The term "hydrocarbon well" is often used to describe wells that facilitate the production of hydrocarbons, including oil wells and oil and gas wells.

Creating a hydrocarbon well typically involves several stages, including a drilling stage, a completion stage and a production stage. The drilling stage normally involves drilling a wellbore into a subsurface formation that is expected to contain a concentration of hydrocarbons that can be produced. The portion of the subsurface formation expected to contain hydrocarbons is often referred to as a "hydrocarbon reservoir" or "reservoir." The drilling process is normally facilitated by a drilling rig that sits at the earth's surface. The drilling rig can provide for operating a drill bit to cut the wellbore, hoisting, lowering and turning drill pipe and tools, circulating drilling fluids in the wellbore, and generally controlling various operations in the wellbore (often referred to as "down-hole" operations). The completion stage involves making the well ready to produce hydrocarbons. In some instances, the completion stage includes installing casing pipe into the wellbore, cementing the casing pipe in place, perforating the casing pipe and cement, installing production tubing, installing downhole valves for regulating production flow, and pumping fluids into the well to fracture, clean or otherwise prepare the reservoir and well to produce hydrocarbons. The production stage involves producing hydrocarbons from the reservoir by way of the well. During the production stage, the drilling rig is normally removed and replaced with a collection of valves at the surface (often referred to as "surface valves" or a "production tree"), and valves are installed into the wellbore (often referred to as "downhole valves"). These surface and downhole valves can be operated to regulate pressure in the wellbore, to control production flow from the wellbore and to provide access to the wellbore in the event further completion work is needed. A pump jack or other mechanism can provide lift that assists in extracting hydrocarbons from the reservoir, especially in instances where the pressure in the well is so low that the hydrocarbons do not flow freely to the surface. Flow from an outlet valve of the production tree is normally connected to a distribution network of midstream facilities, such as tanks, pipelines and transport vehicles, which transport the production to downstream facilities, such as refineries and export terminals.

The various stages of creating a hydrocarbon well often include challenges that are addressed to successfully develop the well. During the drilling stage, a well operator may have to monitor the condition of the wellbore to ensure it is advancing in a suitable trajectory, and it not experiencing issues that may jeopardize the drilling of the wellbore or the overall success of the well. For example, during drilling of a wellbore, a well operator may continually monitor the wellbore for evidence of instability, including deformation and expansion of the wellbore, such as keyseats, washouts, drilling-induced fractures (DIFs) and breakouts (BOs). A keyseat can include a small-diameter channel worn into the side of a larger diameter wellbore, caused, for example, by a sharp change in direction of the wellbore. A keyseat may include an asymmetrical erosion of the wellbore wall due to mechanical impact of the drilling components on the wellbore walls, resulting from a change in the wellbore azimuth or deviation (or "dogleg") or differential mechanical wear of hard and soft rock. A washout can include enlarged region of a wellbore, caused, for example, by weak or unconsolidated formation rock, formation rock weakened by drilling fluids, high bit jet velocity, or mechanical wear by downhole components. A washout may include an enlarged wellbore cross section in all directions around the wellbore. DIFs and BOs can be systematically explained in terms of hoop stresses around a wellbore, and can be used to assess stress and strength of formation rock around the walls of a wellbore. A DIF includes a localized tensile deformation of a wellbore wall, such as a crack, caused when a tensile hoop stress exceeds the tensile strength of the rock at the location of the DIF. A breakout (BO) can include a localized shear deformation of a wellbore wall, manifested as localized rock spalling of the borehole, caused when a compressive hoop stress at the location of the BO exceeds the unconfined compressive strength of the rock at the location. DIFs and BOs typically occur offset from one another by 90 degrees (°). For example, sets of DIFs may occur oriented at about 0° and 180° along a length of a wellbore, accompanied by BOs at about 90° and 270° along the length of a wellbore.

SUMMARY

Applicants have recognized that understanding, predicting and minimizing wellbore instability, including wellbore deformation and expansion, can be critical to successfully drilling and operating a well. Operating a hydrocarbon well, such as an oil well, can be difficult, especially in instances in which the wellbore of the well is drilled into formation rock that is susceptible to failures, including breakouts (BOs) and drilling-induced fractures (DIFs). Applicants have also identified an additional mode of failure, broken-out drilling-induced fractures (BODIFs), that can be critical to understand, and have developed techniques for predicting, characterizing and minimizing the occurrences and effects of BODIFs.

Applicants have recognized the four universally identified and reported wellbore deformation phenomena: keyseats, washouts, BOs and drilling-induced fractures (DIFs). The initiation and enlargement of BOs are symptomatic of compressive hoop stresses in the wellbore reaching and exceeding the compressive strength of the formation rock forming the wall of the wellbore and DIFs are symptomatic of tensile hoop stresses in the wellbore reaching and exceeding the tensile strength of the formation rock forming the wall of the wellbore. Existing techniques often attribute the enlargement to falling-off of formation rock (or "spalling") due to compressive-shear failure at the formation rock forming the wall of the wellbore, induced by maximum compressive stress on opposite sides of the wall of the wellbore. Further, existing techniques often use this relationship and the angular width of BOs and DIFs observed in a wellbore to identify maximum and minimum horizontal in-situ stresses ($\sigma_H$ and $\sigma_h$), using Kirsch's equation (Kirsch, 1898), described in more detail with regard to at least Equation 1. Applicants have recognized that existing techniques generally attribute wellbore enlargement to BOs, and in some instances, keyseats and washouts, and do not consider other modes of failure, such as BODIFs. As a result, existing techniques may not capture the cause of wellbore instability and enlargement, and can lead to misrepresentation of the stresses occurring at the walls of the wellbore, and may not accurately predict failure of the formation rock at walls of the wellbore.

Recognizing these and other shortcomings of existing techniques, Applicants have developed techniques for predicting the occurrence and extent of the instability and failure of formation rock at the walls of wellbores by way of BODIFs—a failure mode that is not considered or accounted for by existing techniques—and have developed techniques for inhibiting the occurrence of, and reducing the effects of, the failure of formation rock at the walls of wellbores by way of BODIFs. In some embodiments, the technique includes predicting (or otherwise determining) that a wellbore is susceptible to BODIFs in response to determining the following: (a) a minimum circumferential hoop stress ($\sigma\theta\theta^{MIN}$) of a wellbore drilled into a subsurface formation is less than or equal to a tensile strength ($T_o$) of formation rock in the wellbore; (b) a lamination density ($D_L$) of the formation rock is greater than a threshold lamination density ($D_{Lthres}$); (c) a composition of the formation rock is a clay rich laminate; and (d) a linear swelling ratio (LSR) of the formation rock is within a specified range. For example, it may be predicted that a segment of wellbore is susceptible to BODIFs if the segment of a wellbore exhibits each of the above characteristics. The technique can also include operating the well to inhibit the occurrence of, and reduce the effects of, BODIFs, in response to predicting that a segment of wellbore is susceptible to BODIFs. For example, for a well determined to be susceptible to BODIFs, the wellbore may be drilled using a particular type of drilling fluid (e.g., an oil based drilling mud), using a particular weight of drilling fluid (e.g., a relatively low density drilling fluid), or using a drilling fluid additive (e.g., lost circulation materials (LCMs)) to inhibit the occurrence of and reduce the effects of BODIFs. As a further example, completion operations for the well may include casing the segment of the wellbore determined to be susceptible to BODIFs, to inhibit the occurrence of and reduce the effects of BODIFs. As yet another example, production operating parameters for the well (e.g., production rate or pressure) may be controlled to inhibit the occurrence of and reduce the effects of BODIFs. In the context of well design, well stimulation operations (e.g., hydraulic fracturing or "hydrofracturing"), well models, field models, well designs and associated field development plans (FDPs) may be constrained by parameters to inhibit the occurrence of BODIFs. Continuing with the above example, a well design or simulation for a well determined to be susceptible to BODIFs may constrain the well to use of an oil based drilling fluid having less than the threshold drilling fluid density casing in at least the segment of the wellbore determined to be susceptible to BODIFs, operating the well at or below a maximum production rate, or operating the well at or above a minimum bottom-hole pressure (BHP). BODIF like failures can also occur deep within formation rock, away from a wellbore, for example, as a result of stimulation operations, such as hydraulic fracturing. BODIFs may indicate that stimulation operations may be less effective or ineffective due to the potential failure of the formation rock, and thus stimulation operations parameters may be adjusted, or stimulation operations may not be performed, to mitigate the risk of BODIFs occurring in the formation.

Provided in some embodiments is a method of stabilizing a wellbore. The method includes the following: determining a minimum circumferential hoop stress ($\sigma\theta\theta^{MIN}$) of a cross section of a wellbore drilled into a subsurface formation; determining that the minimum circumferential hoop stress ($\sigma\theta\theta^{MIN}$) is less than or equal to a tensile strength ($T_o$) of formation rock in the cross section of the wellbore; in response to determining that the minimum circumferential hoop stress ($\sigma\theta\theta^{MIN}$) is less than or equal to the tensile strength ($T_o$) of the formation rock: conducting a rock fabric/textural assessment of the formation rock to determine a lamination density ($D_L$) of the formation rock; conducting a bulk rock composition and clay fraction assessment of the formation rock to determine a composition of the formation rock; conducting a linear swelling test to determine a linear swelling ratio (LSR) of the formation rock; determining the following: the lamination density ($D_L$) of the formation rock is greater than a threshold lamination density ($D_{Lthres}$); the composition of the formation rock is a clay rich laminate defined by a bulk rock mineralogy having the following composition characteristics: (a) the formation rock having greater than a threshold amount of swelling clays, (b) the formation rock having siliceous mudstones and muddy siltstones having greater than a threshold amount of quartz, and (c) the formation rock having greater than a threshold amount of total clay; and the LSR of the formation rock is within a specified LSR range; in response to determining that the lamination density ($D_L$) of the formation rock is greater than a threshold lamination density ($D_{Lthres}$), the composition of the formation rock is a clay rich laminate, and the LSR of the formation rock is within the specified LSR range, determining that the formation rock is susceptible to broken-out drilling-induced fractures (BODIFs); in response to determining that the formation rock is susceptible to broken-out drilling-induced fractures (BODIFs), operating the well to inhibit the occurrence of BODIFs.

In some embodiments, operating the well to inhibit the occurrence of BODIFs includes circulating, into the wellbore, oil based drilling fluids. In certain embodiments, the method further includes: in response to determining that the formation rock is susceptible to BODIFs, determining a threshold drilling fluid density, where operating the well to inhibit the occurrence of BODIFs includes circulating, into the wellbore, drilling fluids having a fluid density that is equal to or less than the threshold drilling fluid density. In some embodiments, the bulk rock composition and clay fraction assessment of the formation rock to determine the composition of the formation rock is conducted in response to determining that the lamination density ($D_L$) of the formation rock is greater than the threshold lamination density ($D_{Lthres}$), and the linear swelling test to determine the LSR of the formation rock is conducted in response to determining that the composition of the formation rock is a clay rich laminate. In certain embodiments, the specified LSR range is 26% to 34%. In some embodiments, the method further includes: determining a predicted height ($H_{BODIF}$) of BODIFs in the wellbore; and determining a predicted angular width ($W_{BODIF}$) of BODIFs in the wellbore, where operating the well to inhibit the occurrence of BODIFs includes conducting a well operation based on the predicted height ($H_{BODIF}$) and predicted angular width ($W_{BODIF}$) of BODIFs in the wellbore. In some embodiments, the predicted height ($H_{BODIF}$) of BODIFs in the wellbore is determined according to the following relationship:

$$H_{BODIF} = C \times T_{LU}$$

where C is 1 if the minimum circumferential hoop stress ($\sigma\theta\theta^{MIN}$) is a tensile stress and C is 0 if the minimum circumferential hoop stress ($\sigma\theta\theta^{MIN}$) is not a tensile stress, and $T_{LU}$ is a thickness of a layer of the formation rock having a lamination density ($D_L$) greater than the threshold lamination density ($D_{Lthres}$) and having greater than the threshold amount of swelling clays, and where the predicted width ($W_{BODIF}$) of BODIFs in the wellbore is determined according to the following relationship:

$$W_{BODIFs} \geq LSR \times 360 / \pi r$$

where r is the radius of the wellbore and LSR is the LSR of the formation rock. IN certain embodiments, determining the minimum circumferential hoop stress ($\sigma\theta\theta^{MIN}$) of the cross section of the wellbore is determined according to the following relationship:

$$\sigma\theta\theta^{MIN} = 3\sigma_h - \sigma_H - 2P_o - \Delta P - \sigma^{\Delta T}$$

where $\sigma_H$ is a maximum horizontal in-situ stress around the circumference of the wall of the wellbore, $\sigma_h$ is a minimum horizontal in-situ stress around the circumference of the wall of the wellbore, $\Delta P$ is a difference between a formation rock pore pressure ($P_o$) and a pressure of drilling fluid in the wellbore ($P_w$), and $\sigma^{\Delta T}$ is a thermal cooling stress of the subsurface formation. In some embodiments, conducting the rock fabric/textural assessment of the formation rock to determine the lamination density ($D_L$) of the formation rock includes conducting a transparent light optical microscopy and scanning electron microscopy (SEM) of the formation rock to determine the lamination density ($D_L$) of the formation rock. In certain embodiments, conducting the bulk rock composition and clay fraction assessment of the formation rock to determine the composition of the formation rock includes conducting an X-ray diffraction (XRD) to determine the composition of the formation rock. In some embodiments, conducting the linear swelling test to determine the LSR of the formation rock includes crushing, sieving and reconstituting clay fractions of the formation rock to form pellets, exposing the pellets to a water solution, and measuring linear expansion of the pellets exposed to the water solution.

Provided in some embodiments is a method that includes the following: determining that a minimum circumferential hoop stress ($\sigma\theta\theta^{MIN}$) of a wellbore drilled into a subsurface formation is less than or equal to a tensile strength ($T_o$) of formation rock in the wellbore; determining that a lamination density ($D_L$) of the formation rock is greater than a threshold lamination density ($D_{Lthres}$); determining that a composition of the formation rock is a clay rich laminate; determining that a linear swelling ratio (LSR) of the formation rock is within a specified range; and in response to determining that the minimum circumferential hoop stress ($\sigma\theta\theta^{MIN}$) is less than or equal to the tensile strength ($T_o$) of formation rock in the wellbore, the lamination density ($D_L$) of the formation rock is greater than the threshold lamination density ($D_{Lthres}$), the composition of the formation rock is a clay rich laminate, and the LSR of the formation rock is within the specified range, operating the well to inhibit the occurrence of broken-out drilling-induced fractures (BODIFs).

In some embodiments, determining that a composition of the formation rock is a clay rich laminate includes determining that the formation rock has a bulk rock mineralogy having the following composition characteristics: (a) the formation rock having greater than a threshold amount of swelling clays, (b) the formation rock having siliceous mudstones and muddy siltstones having greater than a threshold amount of quartz, and (c) the formation rock having greater than a threshold amount of total clay. In certain embodiments, operating the well to inhibit the occurrence of BODIFs includes circulating, into the wellbore, oil based drilling fluids. In some embodiments, the method further includes: in response to determining that the lamination density (DL) of the formation rock is greater than the threshold lamination density ($D_{Lthres}$), the composition of the formation rock is a clay rich laminate, and the LSR of the formation rock is within the specified range, determining a threshold drilling fluid density, where operating the well to inhibit the occurrence of BODIFs includes circulating, into the wellbore, drilling fluids having a fluid density that is equal to or less than the threshold drilling fluid density. In certain embodiments, the specified LSR range is 26% to 34%. In some embodiments, the method further includes: determining a predicted height ($H_{BODIF}$) of BODIFs in the wellbore; and determining a predicted angular width ($W_{BODIF}$) of BODIFs in the wellbore, where operating the well to inhibit the occurrence of BODIFs includes conducting a well operation based on the predicted height ($H_{BODIF}$) and predicted angular width ($W_{BODIF}$) of BODIFs in the wellbore. In some embodiments, the predicted height ($H_{BODIF}$) of BODIFs in the wellbore is determined according to the following relationship:

$$H_{BODIF} = C \times T_{LU}$$

where C is 1 if the minimum circumferential hoop stress ($\sigma\theta\theta^{MIN}$) is a tensile stress and C is 0 if the minimum circumferential hoop stress ($\sigma\theta\theta^{MIN}$) is not a tensile stress, and $T_{LU}$ is a thickness of a layer of the formation rock having a lamination density ($D_L$) greater than the threshold lamination density ($D_{Lthres}$) and having greater than the threshold amount of swelling clays, and where the predicted width ($W_{BODIF}$) of BODIFs in the wellbore is determined according to the following relationship:

$$W_{BODIFs} \geq LSR \times 360 / \pi r$$

where r is the radius of the wellbore and LSR is the LSR of the formation rock. In some embodiments, the method further includes determining the minimum circumferential hoop stress ($\sigma\theta\theta^{MIN}$) of the cross section of the wellbore according to the following relationship:

$$\sigma\theta\theta^{MIN} = 3\sigma_h - \sigma_H - 2P_o - \Delta P - \sigma^{\Delta T}$$

where $\sigma_H$ is a maximum horizontal in-situ stress around the circumference of the wall of the wellbore, $\sigma_h$ is a minimum horizontal in-situ stress around the circumference of the wall of the wellbore, $\Delta P$ is a difference between a formation rock pore pressure ($P_o$) and a pressure of drilling fluid in the wellbore ($P_w$), and $\sigma^{\Delta T}$ is a thermal cooling stress of the subsurface formation. In certain embodiments, the method further includes: conducting a rock fabric/textural assessment of the formation rock to determine the lamination density ($D_L$) of the formation rock; conducting a bulk rock composition and clay fraction assessment of the formation rock to determine the composition of the formation rock; and conducting a linear swelling test to determine the LSR of the formation rock. In some embodiments, conducting the rock fabric/textural assessment of the formation rock to determine the lamination density ($D_L$) of the formation rock includes conducting a transparent light optical microscopy and scanning electron microscopy (SEM) of the formation rock to determine the lamination density ($D_L$) of the formation rock. In some embodiments, conducting the bulk rock composition and clay fraction assessment of the formation rock to determine the composition of the formation rock includes conducting an X-ray diffraction (XRD) to determine the composition of the formation rock. In certain embodiments, conducting the linear swelling test to determine the LSR of the formation rock includes crushing, sieving and reconstituting clay fractions of the formation rock to form pellets, exposing the pellets to a water solution, and measuring linear expansion of the pellets exposed to the water solution.

Provided in some embodiments is a non-transitory computer readable storage medium including program instructions stored thereon that are executable by a processor to perform the method operations described above.

Provided in some embodiments is a hydrocarbon production well system, including: a well system; and a well control system adapted to perform the following operations: determining that a minimum circumferential hoop stress ($\sigma\theta\theta^{MIN}$) in a wellbore drilled into a subsurface formation is less than or equal to a tensile strength ($T_o$) of formation rock in the wellbore; determining that a lamination density ($D_L$) of the formation rock is greater than a threshold lamination density ($D_{Lthres}$); determining that a composition of the formation rock is a clay rich laminate; determining that a linear swelling ratio (LSR) of the formation rock is within a specified range; and in response to determining that the minimum circumferential hoop stress ($\sigma\theta\theta^{MIN}$) is less than or equal to the tensile strength ($T_o$) of formation rock in the wellbore, the lamination density ($D_L$) of the formation rock is greater than the threshold lamination density ($D_{Lthres}$), the composition of the formation rock is a clay rich laminate, and the LSR of the formation rock is within the specified range, operate the well system to inhibit the occurrence of broken-out drilling-induced fractures (BODIFs) in the wellbore.

While this disclosure is susceptible to various modifications and alternative forms, specific embodiments are shown by way of example in the drawings and will be described in detail. The drawings may not be to scale. It should be understood that the drawings and the detailed descriptions are not intended to limit the disclosure to the particular form disclosed, but are intended to disclose modifications, equivalents, and alternatives falling within the spirit and scope of the present disclosure as defined by the claims.

DETAILED DESCRIPTION

Described are embodiments of novel systems and methods for minimizing wellbore instability, including wellbore deformation and expansion of formation rock at the walls of wellbores by way of broken-out drilling-induced fractures (BODIFs). Embodiments include predicting the occurrence and extent of the instability and failure of formation rock at the walls of wellbores by way of BODIFs—a failure mode that is not considered or accounted for by existing techniques—and include techniques for inhibiting the occurrence of, and reducing the effects of, the failure of formation rock at the walls of wellbores by way of BODIFs. In some embodiments, the technique includes predicting (or otherwise determining) that a wellbore is susceptible to BODIFs in response to determining the following: (a) a minimum circumferential hoop stress ($\sigma\theta\theta^{MIN}$) in a wellbore drilled into a subsurface formation is less than or equal to a tensile strength ($T_o$) of formation rock in the wellbore; (b) a lamination density ($D_L$) of the formation rock is greater than a threshold lamination density ($D_{Lthres}$); (c) a composition of the formation rock is a clay rich laminate; and (d) a linear swelling ratio (LSR) of the formation rock is within a specified range. For example, it may be predicted that a segment of wellbore is susceptible to BODIFs if the segment of a wellbore exhibits each of the above characteristics. The technique can also include operating the well to inhibit the occurrence of, and reduce the effects of, BODIFs, in response to predicting that a segment of wellbore is susceptible to BODIFs. For example, for a well determined to be susceptible to BODIFs, the wellbore may be drilled using a particular type of drilling fluid (e.g., an oil based drilling mud), using a particular weight of drilling fluid (e.g., a relatively low density drilling fluid), or using a drilling fluid additive (e.g., lost circulation materials (LCMs)) to inhibit the occurrence of and reduce the effects of BODIFs. As a further example, completion operations for the well may include casing the segment of the wellbore determined to be susceptible to BODIFs, to inhibit the occurrence of and reduce the effects of BODIFs. As yet another example, production operating parameters for the well (e.g., production rate or pressure) may be controlled to inhibit the occurrence of and reduce the effects of BODIFs. In the context of well design, well stimulation operations (e.g., hydraulic fracturing or "hydrofracturing"), well models, field models, well designs and associated field development plans (FDPs) may be constrained by parameters to inhibit the occurrence of BODIFs. Continuing with the above example, a well design or simulation for the well determined to be susceptible to BODIFs may constrain the well to use of an oil based drilling fluid having less than the threshold drilling fluid density casing in at least the segment of the wellbore determined to be susceptible to BODIFs, operating the well at or below a maximum production rate, or operating the well at or above a minimum bottom-hole pressure (BHP). BODIF like failures can also occur deep within formation rock, away from a wellbore, for example, as a result of stimulation operations, such as hydraulic fracturing. BODIFs may indicate that stimulation operations may be less effective or ineffective due to the potential failure of the formation rock, and thus stimulation operations parameters may be adjusted, or stimulation operations may not be performed, to mitigate the risk of BODIFs occurring in the formation.

Although certain embodiments are described in the context of developing hydrocarbon wells, the techniques described may be applied in other context, such as in the development of water wells and other types of wells.

Figure 1:
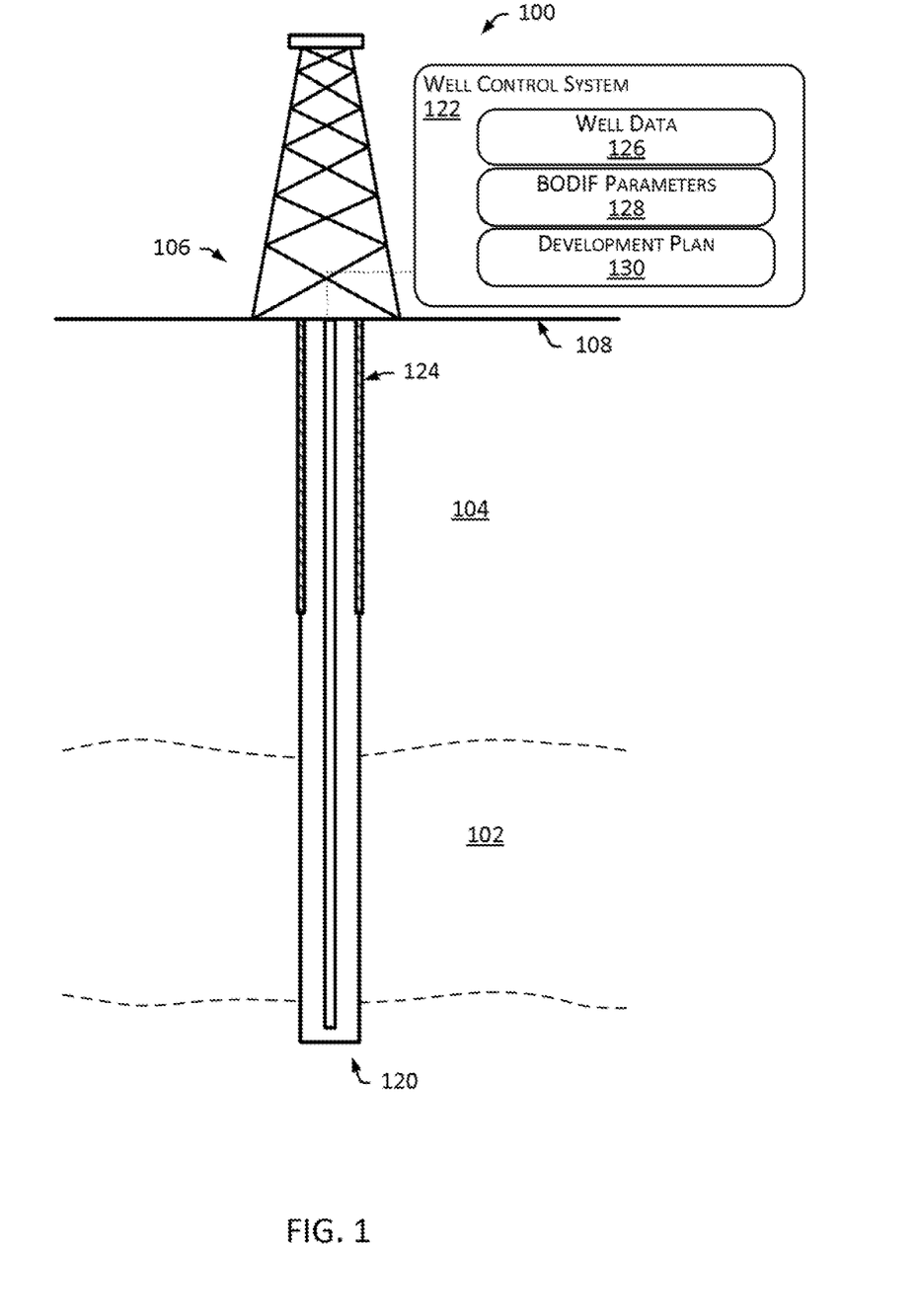
FIG. 1 is diagram that illustrates a well environment, in accordance with one or more embodiments.

FIG. 1 is a diagram that illustrates a well environment 100 in accordance with one or more embodiments. In the illustrated embodiment, the well environment 100 includes a reservoir ("reservoir") 102 located in a subsurface formation ("formation") 104 and a well system ("well") 106.

The formation 104 may include a porous or fractured rock formation that resides underground, beneath the earth's surface ("surface") 108. In the case of the well 106 being a hydrocarbon well, the reservoir 102 may include a portion of the formation 104 that contains (or that is at least determined to or expected to contain) a subsurface pool of hydrocarbons, such as oil and gas. The formation 104 and the reservoir 102 may each include different layers of rock having varying characteristics, such as varying degrees of permeability, porosity, and fluid saturations. In the case of the well 106 being operated as a production well, the well 106 may facilitate the extraction of hydrocarbons (or "production") from the reservoir 102. In the case of the well 106 being operated as an injection well, the well 106 may facilitate the injection of substances, such as gas or water, into the reservoir 102. In the case of the well 106 being operated as a monitoring well, the well 106 may facilitate the monitoring of various characteristics of the formation 104 or the reservoir 102, such reservoir pressure.

The well 106 may include a wellbore 120 and a well control system ("control system") 122. The control system 122 may control various operations of the well 106, such as well drilling operations, well completion operations, well production operations, or well and formation monitoring operations. In some embodiments, the control system 122 includes a computer system that is the same as or similar to that of computer system 1000 described with regard to at least FIG. 5.

During drilling operations, drilling fluid, such as drilling mud, may be circulated in the wellbore 120. This can provide hydrostatic pressure to support walls of the wellbore 120, to prevent formation fluids from flowing into the wellbore 120, to cool and clean a drill bit, and to carry drill cuttings away from the drill bit and out of the wellbore 120. During a well logging operation, a logging tool may be lowered into the wellbore 120 and be operated to measure characteristics of the wellbore 120 as it is moved along a length of the wellbore 120. In some instances, the measurements are recorded in a corresponding well log that provides a mapping of the measurements versus depth in the wellbore 120. During completion operations, various components may be installed (e.g., casing or production tubing installed in the wellbore 120) or operations may be undertaken (e.g., pumping fluids into the wellbore 120 to fracture, clean or otherwise prepare the reservoir 102 to produce hydrocarbons) to make the well 106 ready to produce hydrocarbons. During production operations, a drilling rig used to drill the well 106 may be removed and replaced with a collection of valves (or a "production tree") that regulates pressure in the wellbore 120, that controls production flow from the wellbore 120, and that provides access to the wellbore 120. Flow from an outlet valve of the production tree may be coupled to a distribution network, such as pipelines, storage tanks, and transport vehicles that transport the production to refineries and export terminals.

The wellbore 120 (or "borehole") may include a bored hole that extends from the surface 108 into a target zone of the formation 104, such as the reservoir 102. An upper end of the wellbore 120, at or near the surface 108, may be referred to as the "up-hole" end of the wellbore 120, and a lower end of the wellbore 120, terminating in the formation 104, may be referred to as the "down-hole" end of the wellbore 120. The wellbore 120 may be created, for example, by a drill bit boring through the formation 104 and the reservoir 102. The wellbore 120 may provide for the circulation of drilling fluids during drilling operations, the flow of hydrocarbons (e.g., oil and gas) from the reservoir 102 to the surface 108 during production operations, the injection of substances (e.g., water) into the formation 104 or the reservoir 102 during injection operations, or the communication of monitoring devices (e.g., logging tools) into one or both of the formation 104 and the reservoir 102 during monitoring operations (e.g., during in situ logging operations). In some embodiments, the wellbore 120 includes cased or uncased (or "open-hole") portions. A cased portion may include a portion of the wellbore 120 (e.g., the up-hole end of the wellbore 120) having casing 124 (e.g., casing pipe and casing cement) installed. An uncased portion may include a portion of the wellbore 120 (e.g., the down-hole end of the wellbore 120) not having casing 124 installed.

In some embodiments, the control system 122 stores, or otherwise has access to, well data 126. The well data 126 may include data that is indicative of various characteristics of the well 106, the formation 104 or the reservoir 102. The well data 126 may include, for example, a well location, a well trajectory, well logs (e.g., caliper logs, ultrasonic logs, or resistivity logs for the well 106), well and formation parameters, and formation rock characteristics. A well location may include coordinates defining the location where the up-hole end of the wellbore 120 penetrates the earth's surface 108. A well trajectory may include coordinates defining a path of the wellbore 120, from the up-hole end of the wellbore 120 to a down-hole end of the wellbore 120. A caliper log may include a log of measurements of the size and shape of the wellbore 120 versus depth in the wellbore 120. The caliper log may be obtained by way of a caliper tool that is lowered into the wellbore 120, and that measures the size and shape of the wellbore 120 as it is moved along the length of the wellbore 120. An ultrasonic log may include a log of images of the walls of the wellbore 120 versus depth in the wellbore 120. The ultrasonic log may be obtained by way of an ultrasonic logging tool that is lowered into the wellbore 120, and that acquires ultrasonic images of the walls of the wellbore 120 as it is moved along the length of the wellbore 120. The well and formation parameters may include the pore pressure ($P_o$) of the rock of the formation 104 (or "formation rock"), the drilling fluids pressure ($P_w$), and maximum and minimum horizontal in-situ stresses ($\sigma_H$ and $\sigma_h$) in the formation at the wellbore 120. The pore pressure ($P_o$) of the formation rock may be determined based on resistivity, sonic or density logs for the well 106. The drilling fluids pressure ($P_w$) may be determined based on the density of the drilling fluid present in the wellbore 120. The maximum and minimum horizontal in-situ stresses ($\sigma_H$ and $\sigma_h$) may be determined, for example, by way of simulation or modeling of the stresses in the formation rock at the walls of the wellbore 120, or based on observations of existing failures of the formation rock at the walls of the wellbore 120 (e.g., breakouts (BOs) or drilling-induced fractures (DIFs)) and corresponding stresses associated with the failures of the formation rock at the walls of the wellbore 120. In some embodiments, the minimum horizontal stress ($\sigma_h$) is estimated from one or more borehole injection tests. A borehole injection test may include injecting fluids, and monitoring a pressure response in the wellbore to generate pressure versus time curves, which can be assessed to determine the minimum horizontal stress ($\sigma_h$). The borehole injection tests can include one or more of the following: micro-fracture tests, mini-fracture tests, leak-off tests and massive hydraulic fracturing. Times when fractures open and close can be determined based on assessing the results of these tests, such as interpreting pressure vs. time curves to determine when fractures open and close and an associated minimum horizontal stress ($\sigma_h$). In some embodiments, the maximum horizontal stress ($\sigma_H$) magnitude is derived through failure simulations, failure criteria equations, and full wave sonic logs in vertical wells.

Formation rock characteristics may include a tensile strength ($T_o$) of the formation rock at the wall of the wellbore 120, a compressional strength ($C_o$) of the formation rock at the wall of the wellbore 120, a lamination density ($D_L$) of the formation rock at the wall of the wellbore 120, a composition of the formation rock (e.g., clay rich laminate) at the wall of the wellbore 120, or a linear swelling ratio (LSR) of the formation rock at the wall of the wellbore 120. The formation rock characteristics may be determined, for example, by way of a laboratory assessment of core samples of the formation, down-hole loggings of the wellbore 120 (or other wellbores in the formation 104) and corresponding well logs, or using known values for formation rock of the formation 104.

In some embodiments, the control system 122 stores, or otherwise has access to, BODIF parameters 128. The BODIF parameters 128 may specify values for use in assessing whether the wellbore 120 of the well 106 is susceptible to failure by way of BODIFs. The BODIF parameters 128 may include a specified threshold lamination density ($D_{Lthres}$) for the wellbore 120, specified characteristics of a clay rich laminate composition, and a specified LSR range for the wellbore 120. The BODIF parameters 128 may be predefined, for example, by a well operator.

As described, the control system 122 may assess the formation 104 and the wellbore 120 to determine characteristics of the formation 104 and the wellbore 120, and to determine whether or not the wellbore 120 is susceptible to BODIFs. In some embodiments, the control system 122 generates, stores or executes a well development plan 130. A well development plan 130 may specify parameters for developing the well 106 (or other wells in the formation 104) to inhibit wellbore failures, including BODIFs. The parameters may specify parameters for drilling fluid used to drill the well 106 (or other wells in the formation 104) to inhibit the occurrence of, and reduce the effects of, BODIFs, such as a particular type of drilling fluid (e.g., an oil based drilling mud), a particular weight of drilling fluid (e.g., a relatively low density drilling fluid), or a drilling fluid additive (e.g., lost circulation materials (LCMs)). The parameters may specify completion parameters for the well 106 (or other wells in the formation 104) to inhibit the occurrence of, and reduce the effects of, BODIFs, such as certain intervals of the wellbore 120 to be cased. The parameters may specify production operating parameters for the well 106 (or other wells in the formation 104) to inhibit the occurrence of, and reduce the effects of, BODIFs, such as production rates and pressures. The parameters may specify simulation parameters for the well 106 (or other wells in the formation 104) to inhibit the occurrence of, and reduce the effects of, BODIFs, such as constraints including use of an oil based drilling fluid having equal to or less than a threshold drilling fluid density and providing casing in at least wellbore segments determined to be susceptible to BODIFs, or operating at or below a maximum production rate or at or above a minimum bottom-hole pressure (BHP).

Figure 2A:
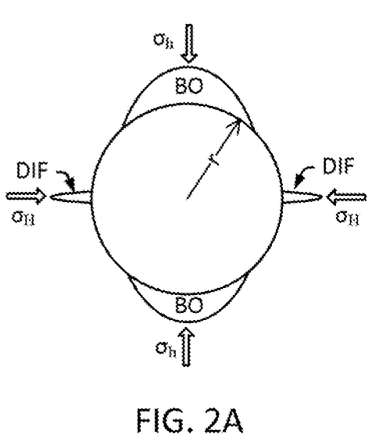
FIGS. 2A and 2B are cross-sectional diagrams of a wellbore that illustrate example hoop stresses acting on the wellbore and associated modes of failure, in accordance with one or more embodiments.
Figure 2B:
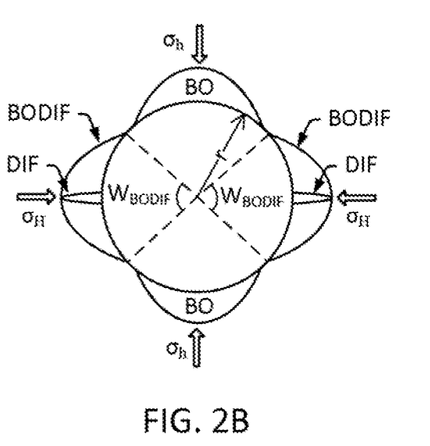

Understanding the in-situ stresses of a formation and the resulting modes of failure can be helpful in understanding the described embodiments. FIGS. 2A and 2B are cross-sectional diagrams of a wellbore that illustrate example hoop stresses acting on the wellbore and associated modes of failure, in accordance with one or more embodiments. Each of the diagrams illustrates locations of maximum horizontal in-situ stresses ($\sigma_H$) and locations of minimum horizontal in-situ stresses ($\sigma_h$) in the circular wellbore of a radius (r). As illustrated, the locations of maximum horizontal in-situ stresses ($\sigma_H$) may be located opposite one another, and the locations of minimum horizontal in-situ stresses ($\sigma_h$) may be located opposite one another and offset from the locations of maximum horizontal in-situ stresses ($\sigma_H$) by an angle of about 90°. One of the locations of maximum horizontal in-situ stress ($\sigma_H$) may be assigned an orientation or angular location on the borehole circumference ($\theta$) of 0° for the purpose of further assessment, including application of Kirsch's equation (described in more detail with regard to at least Equation 1). As illustrated, BOs may occur parallel to the direction of minimum horizontal in-situ stresses ($\sigma_h$). The BOs may occur due to a resulting compressive hoop stress acting on the formation rock in the area of the BOs exceeding a compressive strength ($C_o$) of the formation rock. DIFs may occur parallel to the direction of maximum horizontal in-situ stresses ($\sigma_H$). The DIF may occur due to a resulting tensile hoop stress acting on the formation rock in the area of the DIFs exceeding a tensile strength ($T_o$) of the formation rock. A wellbore that is not susceptible to BODIFs may exhibit BOs or DIFs type failures, but not BODIFs, as illustrated in FIG. 2A. A wellbore that is susceptible to BODIFs may experience BODIFs failures, in addition to BO and DIF type failures, as illustrated in FIG. 2B. A BODIF may be characterized as spalling of formation rock at and around the location of DIFs. The extent of a BODIF may be expressed as an angular width of the BODIF ($W_{BODIF}$). As can be seen, a BODIF may enlarge an area of a failure attributable to DIFs. The occurrence of a BODIF can increase instability in a wellbore, and, if the BODIF grows wide enough, it can intersect adjacent breakouts, mimicking the appearance and effect of a washout type failure.

Figure 3A:
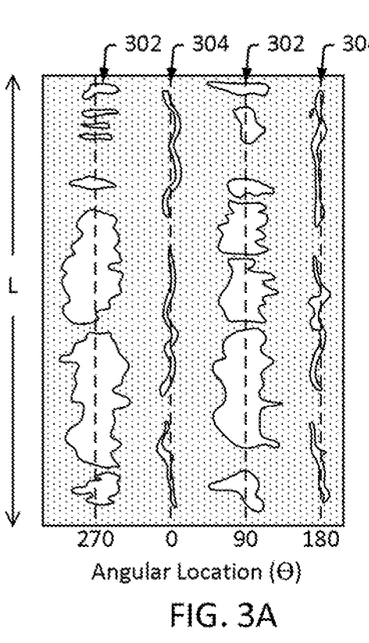
FIGS. 3A and 3B are diagrams that illustrate example breakouts (BOs), drilling-induced fractures (DIFs), and broken-out drilling-induced fractures (BODIFs), in accordance with one or more embodiments.
Figure 3B:
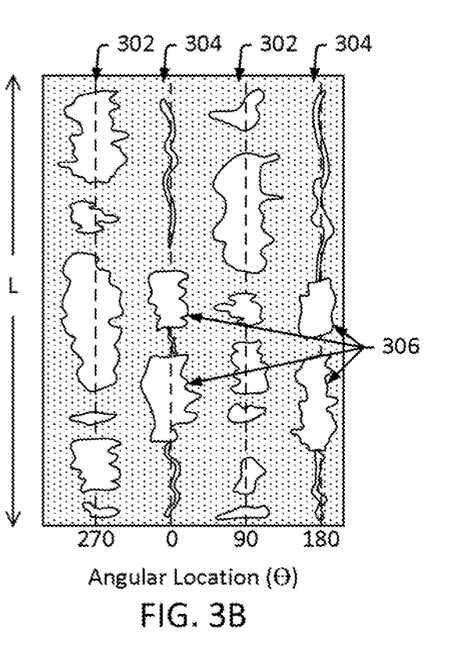

FIGS. 3A and 3B are diagrams that illustrate example breakouts, DIFs, and BODIFs, in accordance with one or more embodiments. Each of the diagrams includes a flattened image representing formation rock around the circumference of a wellbore (e.g., from 0° to 360°), along a length of the wellbore (L). These types of images may be logs generated by way of a logging operation, such as an ultrasonic logging operation or a caliper logging operation. The angular location ($\theta$) of 0° may be assigned to the angle at which a maximum horizontal in-situ stress ($\sigma_H$) occurs, for the purpose of consistency with further assessment of the wellbore, including application of Kirsch's equation (described in more detail with regard to at least Equation 1). In some embodiments, the angular direction of geographic North is assigned the angular location ($\theta$) of 0° (e.g., $\theta=0°$ at the direction of geographic north). FIG. 3A is a first image of a formation rock around the circumference of a wellbore experiencing BOs 302 and DIFs 304. The occurrence of BOs paired with DIFs is one mode of failure, often characterized by longitudinally oriented sets of DIFs 304 occurring along opposite lengths of the walls of the wellbore (e.g., separated from one another by an angle about 180°) at locations of minimum hoop stress (parallel to maximum horizontal in-situ stress) acting on the formation rock forming the walls of the wellbore, and longitudinally oriented sets of BOs 302 occurring along opposite lengths of the walls of the wellbore (e.g., separated from one another by an angle of about 180°) at locations of maximum hoop stress (parallel to minimum horizontal in-situ stress) acting on the formation rock forming the walls of the wellbore, with the longitudinally oriented sets of DIFs 304 and the longitudinally oriented sets of BOs 302 being offset from one another by an angle of about 90°. FIG. 3B is a second image of a formation rock around the circumference of a wellbore experiencing BOs 302, DIFs 304 and BODIFs 306. The occurrence of BOs paired with DIFs and BODIFs is another mode of failure recognized by Applicants. Applicants have determined that this mode of failure can include not only BOs and DIFs in similar locations to that observed in the mode of failure with only BOs and DIFs, but also includes longitudinally oriented breakout style failures located along the length of the DIFs. That is, failure of the formation rock in a size and shape similar to that of breakouts (which normally occur at angular locations offset from the DIFs) are also occurring at the angular locations of the DIFs. As depicted, the BODIFs are aligned along the length of the DIFs and emanate radially from the DIFs.

Based on studies of wellbores, Applicants have recognized that even when DIFs extend along a length of a wellbore, BODIFs can be limited to certain intervals along that length. As the BODIFs may occur at particular intervals along the length of the wellbore and not at other intervals, despite the hoop stresses being similar along the length of the wellbore, Applicants have recognized that BODIFs may not be attributable only to hoop stress acting on the formation rock at the walls of the wellbore. Further, Applicants have recognized that BODIFs can be attributable to a combination of factors, including formation rock type and drilling practices. The BODIF mode of failure is significant for at least the reason that this types of failure can significantly enlarge the size of the wellbore. If the breakouts and the BODIFs are wide enough to intersect one another, the resulting failure can mimic a washout failure of the wellbore. As a result, the failure mode may be mischaracterized as a washout. In some instances, inappropriate operations may be undertaken to remedy a washout, such as adjusting a bit jet velocity, or the failure may simply be attributed to mechanical wear induced by the drilling process and not be addressed. In such an instance, the failure may not be remedied or may worsen. Accordingly, Applicants have recognized the importance of acknowledging and correctly identifying potential and actual occurrences of BODIF type wellbore failure so that appropriate actions can be taken to inhibit the occurrence of BODIFs and limit negative effects of any BODIFs that do occur.

Figure 4:
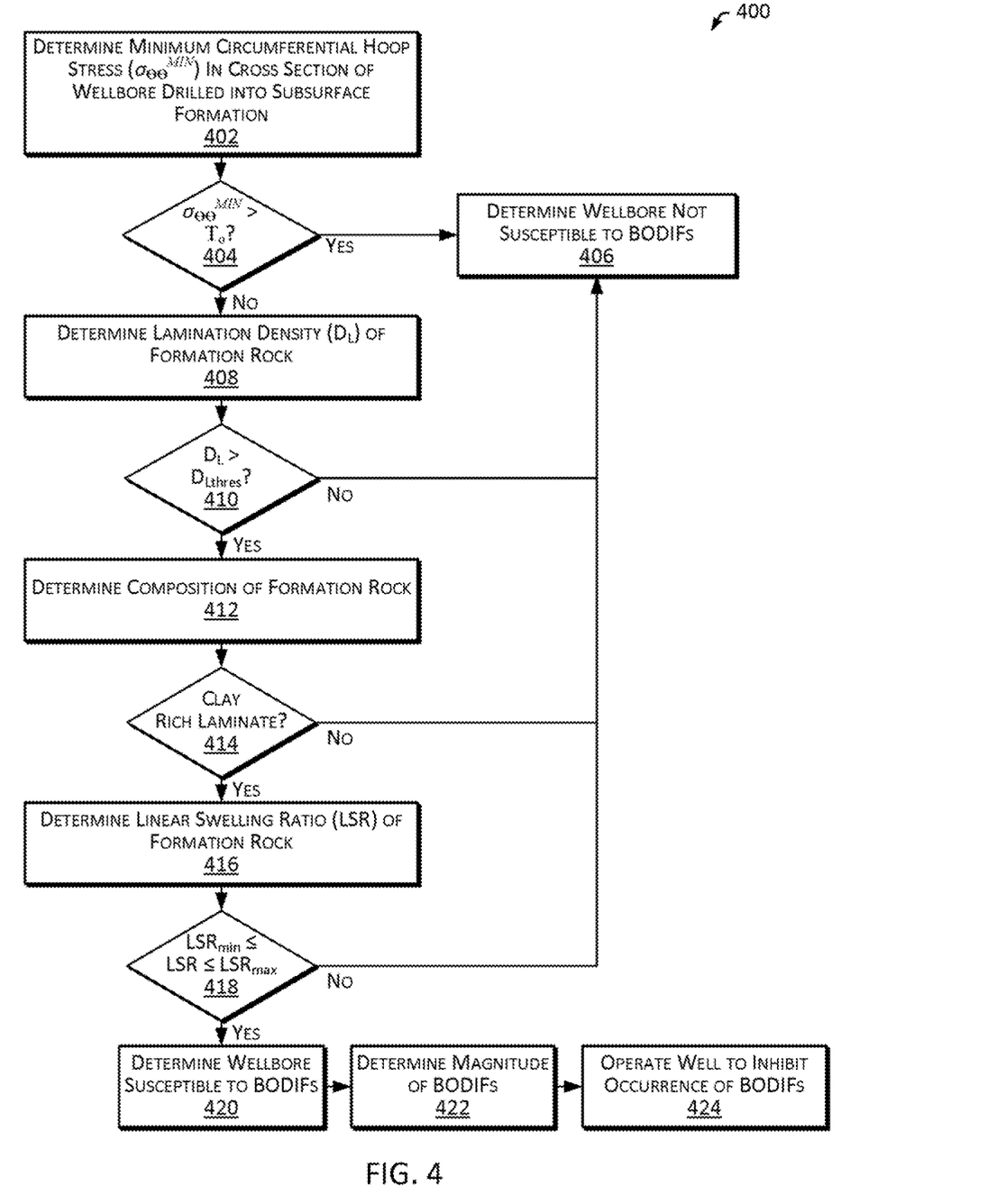
FIG. 4 is a flowchart that illustrates a method of identifying susceptibility of a hydrocarbon well to BODIFs and operating the hydrocarbon well to inhibit the occurrence of, and reduce the effects of, BODIFs, in accordance with one or more embodiments.

FIG. 4 is a flowchart that illustrates a method 400 of identifying susceptibility of a hydrocarbon well to BODIFs and operating the hydrocarbon well to inhibit the occurrence of (and reduce the effects of) BODIFs, in accordance with one or more embodiments. In the context of the well 106, the operations of the method 400 may be performed, for example, by the well control system 122 or another operator of the well 106. For example, a simulation module of the well control system 122 may perform one or more of the data processing operations described to identify whether the wellbore of the well 106 is susceptible to BODIFs. A well operator, such as a control module of the well control system 122 or well personnel, may operate the well 106, for example, drilling using drilling mud of a suitable type or fluid density, to reduce or inhibit the occurrence and reduce the effects of BODIFs.

In some embodiments, the method 400 includes determining a minimum circumferential hoop stress ($\sigma\theta\theta^{MIN}$) in a cross section of a wellbore drilled into a subsurface formation (block 402). This can include, for example, the well control system 122 determining a minimum circumferential hoop stress ($\sigma\theta\theta^{MIN}$) in a cross section of the wellbore 120 drilled into the formation 104. In some embodiments, the minimum circumferential hoop stress ($\sigma\theta\theta^{MIN}$) is determined using Kirsch's equation (Kirsch, 1898) for identifying hoop stresses ($\sigma\theta\theta$) around a cylindrical vertical hole, defined by the following relationship:

$$\sigma\theta\theta = \sigma_H + \sigma_h - 2(\sigma_H - \sigma_h)\cos 2\theta - P_o - P_w \quad (1)$$

where $\sigma\theta\theta$ is the circumferential hoop stress at a given angular location at the circumference of the wall of the wellbore, defined by an angle ($\theta$) between the angular location and an angular location of the maximum horizontal in-situ stress ($\sigma_H$) at the circumference of the wall of the wellbore, $\sigma_H$ is the maximum horizontal in-situ stress around the circumference of the wall of the wellbore, $\sigma_h$ is the minimum horizontal in-situ stress around the circumference of the wall of the wellbore, $P_o$ is the formation rock pore pressure, and $P_w$ is the pressure of drilling fluid in the wellbore. In some embodiments, the angular direction of geographic North is assigned the angular location ($\theta$) of 0° (e.g., $\theta=0°$ at the direction of geographic north). The maximum and minimum horizontal in-situ stresses ($\sigma_H$ and $\sigma_h$) can be determined, for example, based on modeling of the stresses of the formation rock at and around the wellbore, or the observations of the failure (or lack of failure) of formation rock along the walls of the wellbore. Kirsch's equation (equation 1) expresses maximum and minimum circumferential hoop stresses around a vertical borehole in terms of maximum and minimum horizontal in-situ stresses ($\sigma_H$ and $\sigma_h$), the formation rock pore pressure ($P_o$), and the contrast ($\Delta P$) between pore pressure ($P_o$) and drilling fluids pressure ($P_w$). The maximum circumferential hoop stress ($\sigma\theta\theta^{MAX}$) can be defined as follows:

$$\sigma\theta\theta^{MAX} = 3\sigma_H\sigma_h - 2P_o - \Delta O - \sigma^{\Delta T} \quad (2)$$

The minimum circumferential hoop stress ($\sigma\theta\theta^{MIN}$) can be defined as follows:

$$\sigma\theta\theta^{MIN} = 3\sigma_h - \sigma_H - 2P_o - \Delta P - \sigma^{\Delta T} \quad (3)$$

where $\sigma^{\Delta T}$ is a thermal cooling stress, which is valid for high-temperature reservoirs (e.g., reservoirs with wellbores having bottom-hole temperatures of greater than about 300° F. (149° C.)). A positive circumferential hoop stress ($\sigma\theta\theta$) indicates a compressive circumferential hoop stress, and a negative circumferential hoop stress ($\sigma\theta\theta$) indicates a tensile circumferential hoop stress. It can be determined that BOs are likely to occur when the maximum circumferential hoop stress ($\sigma\theta\theta^{MAX}$) is positive, and equal to or greater than a compressional strength ($C_o$) of the formation rock at the wall of the wellbore. It can be determined that tensile fractures, such as DIFs, are likely to occur when the minimum circumferential hoop stress ($\sigma\theta\theta^{MAX}$) is negative, and less than or equal to a tensile strength ($T_o$) of the formation rock at the wall of the wellbore.

In some embodiments, the method 400 includes determining whether the minimum circumferential stress ($\sigma\theta\theta^{MIN}$) is less than, equal to, or greater than a tensile strength ($T_o$) of the formation rock at the wall of the wellbore (block 404). This can include, for example, the control system 122 determining whether a minimum circumferential stress ($\sigma\theta\theta^{MIN}$) of the wellbore 120 is less than, equal to, or greater than a tensile strength ($T_o$) of the formation rock at the wall of the wellbore 120.

In some embodiments, the method 400 includes, in response to determining that the minimum circumferential hoop stress ($\sigma\theta\theta^{MIN}$) is greater than the tensile strength ($T_o$) of the formation rock at the wall of the wellbore (i.e., $\sigma\theta\theta^{MIN}$ is compressive), proceeding to determine that the wellbore is not susceptible to BODIFs (block 406). This can include, for example, the control system 122 determining that the wellbore 120 is not susceptible to BODIFs, in response to the control system 122 determining that the minimum circumferential hoop stress ($\sigma\theta\theta^{MIN}$) of the wellbore 120 is greater than the tensile strength ($T_o$) of the formation rock at the wall of the wellbore 120. In some embodiments the tensile strength ($T_o$) of the formation rock is determined by way of a laboratory assessment of core samples of the formation rock or using known values for tensile strength ($T_o$) of the formation rock. The tensile strength ($T_o$) of the formation rock may be stored in or retrieved from the well data 126.

In some embodiments, the method 400 includes, in response to determining that the minimum circumferential hoop stress ($\sigma\theta\theta^{MIN}$) is less than or equal to the tensile strength ($T_o$) of the formation rock at the wall of the wellbore (i.e., $\sigma\theta\theta^{MIN}$ is tensile), proceeding to determine that the wellbore may be susceptible to BODIFs, and proceeding to conduct a further assessment of the susceptibility of the wellbore to BODIFs. This can include, for example, the control system 122 determining that the wellbore 120 may be susceptible to BODIFs and proceeding to conduct a further assessment of the susceptibility of the wellbore 120 to BODIFs, in response to the control system 122 determining that the minimum circumferential hoop stress ($\sigma\theta\theta^{MIN}$) of the wellbore 120 is less than or equal to the tensile strength ($T_o$) of the formation rock at the wall of the wellbore 120.

In some embodiments, the further assessment of the susceptibility of the wellbore to BODIFs of method 400 includes determining a lamination density ($D_L$) of the formation rock at the wall of the wellbore (block 408). This can include, for example, the control system 122 determining a lamination density ($D_L$) of the formation rock at the wall of the wellbore 120. Determining a lamination density ($D_L$) of the formation rock the formation rock at the wall of the wellbore can include conducting a rock fabric/textural assessment of the formation rock to determine the lamination density ($D_L$) of the formation rock. In some embodiments, conducting the rock fabric/textural assessment of the formation rock to determine the lamination density ($D_L$) of the formation rock includes conducting a transparent light optical microscopy and scanning electron microscopy (SEM) of the formation rock to determine the lamination density ($D_L$) of the formation rock. The lamination density ($D_L$) may be stored in or retrieved from the well data 126.

In some embodiments, the further assessment of the susceptibility of the wellbore to BODIFs of method 400 includes determining whether the lamination density ($D_L$) of the formation rock is greater than a threshold lamination density ($D_{Lthres}$) for the wellbore (block 410). This can include, for example, the control system 122 determining whether the lamination density ($D_L$) of the formation rock is greater than a threshold lamination density ($D_{Lthres}$) for the wellbore 120. The threshold lamination density ($D_{Lthres}$) may be predefined value, in the range of about 10 per millimeter (mm) to about 100 per mm (e.g., 20/mm). The threshold lamination density ($D_{Lthres}$) may be stored in or retrieved from the BODIF parameters 128.

In some embodiments, the further assessment of the susceptibility of the wellbore to BODIFs of method 400 includes, in response to determining that the lamination density ($D_L$) of the formation rock is not greater than the threshold lamination density ($D_{Lthres}$) for the wellbore, proceeding to determine that the wellbore is not susceptible to BODIFs (block 406). This can include, for example, the control system 122 determining that the wellbore 120 is not susceptible to BODIFs, in response to the control system 122 determining that the lamination density ($D_L$) of the formation rock is not greater than the threshold lamination density ($D_{Lthres}$) for the wellbore 120.

In some embodiments, the further assessment of the susceptibility of the wellbore to BODIFs of method 400 includes, in response to determining that the lamination density ($D_L$) of the formation rock is greater than the threshold lamination density ($D_{Lthres}$) for the wellbore, proceeding to determine a composition of the formation rock at the wall of the wellbore (block 412) and determining whether the composition of the formation rock at the wall of the wellbore is clay rich laminate (block 414). This can include, for example, the control system 122 determining a composition of the formation rock at the wall of the wellbore 120, and determining whether the composition of the formation rock at the wall of the wellbore 120 is clay rich laminate, in response to the control system 122 determining that the lamination density ($D_L$) of the formation rock is greater than the threshold lamination density ($D_{Lthres}$) for the wellbore 120. The formation rock may be determined to have a clay rich laminate composition, if the following conditions are satisfied: (1) the formation rock has greater than a threshold amount of swelling clays (e.g., the formation rock has greater than about 3.2% swelling clays by volume); (2) the formation rock is siliceous, having siliceous mudstones and muddy siltstones having greater than a threshold amount of quartz (e.g., the formation rock has siliceous mudstones and muddy siltstones having greater than about 36% quartz by volume); (3) the formation rock has greater than a threshold amount of total clay (e.g., the formation rock has greater than about 17% of total clay by volume). In some embodiments the respective conditions of the formation rock is determined by way of a laboratory assessment of core samples of the formation rock or using down-hole loggings of the wellbore (or other wellbores in the formation), and corresponding well logs. The composition of the formation rock, and associated conditions, may be stored in or retrieved from the well data 126.

In some embodiments, the further assessment of the susceptibility of the wellbore to BODIFs of method 400 includes, in response to determining that the composition of the formation rock at the wall of the wellbore is not clay rich laminate, proceeding to determine that the wellbore is not susceptible to BODIFs (block 406). This can include, for example, the control system 122 determining that the wellbore 120 is not susceptible to BODIFs, in response to determining that the composition of the formation rock at the wall of the wellbore 120 is not clay rich laminate.

In some embodiments, the further assessment of the susceptibility of the wellbore to BODIFs of method 400 includes, in response to determining that the composition of the formation rock is clay rich laminate, proceeding to determining a linear swelling ratio (LSR) of the formation rock (block 416). This can include, for example, the control system 122 determining a linear swelling ratio (LSR) of the formation rock surrounding the wellbore 120, in response to the control system 122 determining that the composition of the formation rock is clay rich laminate. Determining the LSR of the formation rock can include conducting a linear swelling test to determine the LSR of the formation rock. In some embodiments, conducting a linear swelling test to determine the LSR of the formation rock includes (a) crushing, sieving and reconstituting clay fractions of the formation rock to form pellets, (b) exposing the pellets to a water solution, and (c) measuring linear expansion of the pellets exposed to the water solution. The LSR of the formation rock may be stored in or retrieved from the well data 126.

In some embodiments, the further assessment of the susceptibility of the wellbore to BODIFs of method 400 includes determining whether the LSR of the formation rock is within a specified LSR range for the wellbore (block 418). This can include, for example, the control system 122 determining whether the LSR of the formation rock surrounding the wellbore 120 is within a specified LSR range for the wellbore 120. The specified LSR range for the wellbore may be predefined range, such as a range of about 25% to about 35% (e.g., $LSR_{min} \leq LSR \leq LSR_{max}$, $LSR_{min}=26\%$, $LSR_{max}=34\%$). The specified LSR range may be stored in or retrieved from the BODIF parameters 128.

In some embodiments, the further assessment of the susceptibility of the wellbore to BODIFs of method 400 includes, in response to determining that the LSR of the formation rock is not within the specified LSR range for the wellbore, proceeding to determine that the wellbore is not susceptible to BODIFs (block 406). This can include, for example, the control system 122 determining that the wellbore 120 is not susceptible to BODIFs, in response to the control system 122 determining that the LSR of the formation rock surrounding the wellbore 120 is not within the specified LSR range for the wellbore 120. In some embodiments, the further assessment of the susceptibility of the wellbore to BODIFs of method 400 includes, in response to determining that the LSR of the formation rock is within the specified LSR range for the wellbore, proceeding to determine that the wellbore is susceptible to BODIFs (block 420). This can include, for example, the control system 122 determining that the wellbore 120 is susceptible to BODIFs, in response to determining that the LSR of the formation rock surrounding the wellbore 120 is within the specified LSR range for the wellbore 120.

In some embodiments, the further assessment of the susceptibility of the wellbore to BODIFs of method 400 includes, in response to determining that the wellbore is susceptible to BODIFs, proceeding to determining a magnitude of the BODIFs in the wellbore (block 422). This can include, for example, the control system 122 determining a magnitude of the BODIFs in the wellbore 120, in response to the control system 122 determining that the wellbore 120 is susceptible to BODIFs. Determining a magnitude of the BODIFs in the wellbore can include determining a predicted height ($H_{BODIF}$) of BODIFs in the wellbore or determining a predicted angular width ($W_{BODIF}$) of BODIFs in the wellbore. In some embodiments, the predicted height ($H_{BODIF}$) of BODIFs in the wellbore is determined according to the following relationship:

$$H_{BODIF} = C \times T_{LU}$$

where C is 1 if the minimum circumferential hoop stress ($\sigma\theta\theta^{MIN}$) is a tensile stress and C is 0 if the minimum circumferential hoop stress ($\sigma\theta\theta^{MIN}$) is not a tensile stress, and $T_{LU}$ is a thickness of a layer of the formation rock having a lamination density ($D_L$) greater than the threshold lamination density ($D_{Lthres}$) and having greater than the threshold amount of swelling clays. In some embodiments, the predicted width ($W_{BODIF}$) of BODIFs in the wellbore is determined according to the following relationship:

$$W_{BODIFs} \geq LSR \times 360/\pi r$$

where r is the radius of the wellbore and LSR is the LSR of the formation rock.

In some embodiments, the method 400 includes, in response to determining that the wellbore is susceptible to BODIFs and determining the predicted magnitude of the BODIFs in the wellbore, proceeding to operating the well to inhibit the occurrence of BODIFs (block 424). This can include, for example, the control system 122 (or another operator of the well 106, such as well personnel) controlling operations of the well 106 to inhibit the occurrence of BODIFs. Operating the well to inhibit the occurrence of BODIFs can include operating the well with operating parameters that that inhibit the occurrence of BODIFs, or at least reduce negative effects of BODIFs on the operation of the well. In some embodiments, operating the well to inhibit the occurrence of BODIFs includes controlling characteristics of drilling fluid circulated into the wellbore during drilling operations. For example, operating the well to inhibit the occurrence of BODIFs can include using an oil-based drilling fluid, as opposed to a water-based drilling fluid. As another example, operating the well to inhibit the occurrence of BODIFs can include determining a threshold drilling fluid density (e.g., a density that provides a pressure in the wellbore that is equal or less than the pressure required to initiate the drilling induced fracture DIF) to inhibit the occurrence of DIF along which BODIFs develop (or at least minimize the effect of BODIFs), and circulating, into the wellbore, drilling fluids having a fluid density that is equal to or less than the threshold drilling fluid density. A relatively low fluid density may reduce the minimum hoop stress (see equation 2) to a level below that required to develop the DIF and thereby inhibit the occurrence of BODIFs. In some embodiments, operating the well to inhibit the occurrence of BODIFs includes conducting completion or production operations to inhibit the occurrence of BODIFs. For example, if a segment of the wellbore 120 is determined to be susceptible to BODIFs, operating the well 106 to inhibit the occurrence of BODIFs can include casing the segment (or other portions of the wellbore 120) to inhibit the occurrence of BODIFs (or at least minimize the effect of BODIFs) in the segment (or other portions of the wellbore 120). As a further example, if the wellbore 120 is determined to be susceptible to BODIFs, operating the well 106 to inhibit the occurrence of BODIFs can include determining a maximum production rate (or minimum BHP) to reduce the occurrence of BODIFs (or at least minimize the effect of BODIFs) in the wellbore 120, and the well 106 can be operated at or below the maximum production rate (or at or above the minimum BHP). In the context of well design, well stimulation operations (e.g., hydraulic fracturing or "hydrofracturing"), the well models, field models and well design and associated field development plans (FDPs) may be constrained by parameters to inhibit the occurrence of BODIFs. Continuing with the above example, a well simulation may constrain the well 106 to use of an oil based drilling fluid having equal to or less than the threshold drilling fluid density and at least the threshold amount of lost circulation materials (LCMs), including casing in the segment of the wellbore 120 (or other portions of the wellbore 120), operating the well 106 at or below the maximum production rate, or operating the well 106 at or above the minimum BHP. BODIFs may indicate that stimulation operations may be less effective or ineffective due to the potential failure of the formation rock. As a further example, if the well 106 is determined to be susceptible to BODIFs stimulation operations parameters may be adjusted and an injection operation be performed using those parameters (e.g., an injection rate or pressure of the injection operation may be decreased below threshold values), or stimulation operations may not be performed, to mitigate the risk of BODIFs occurring in the well 106 and the formation 104.

Figure 5:
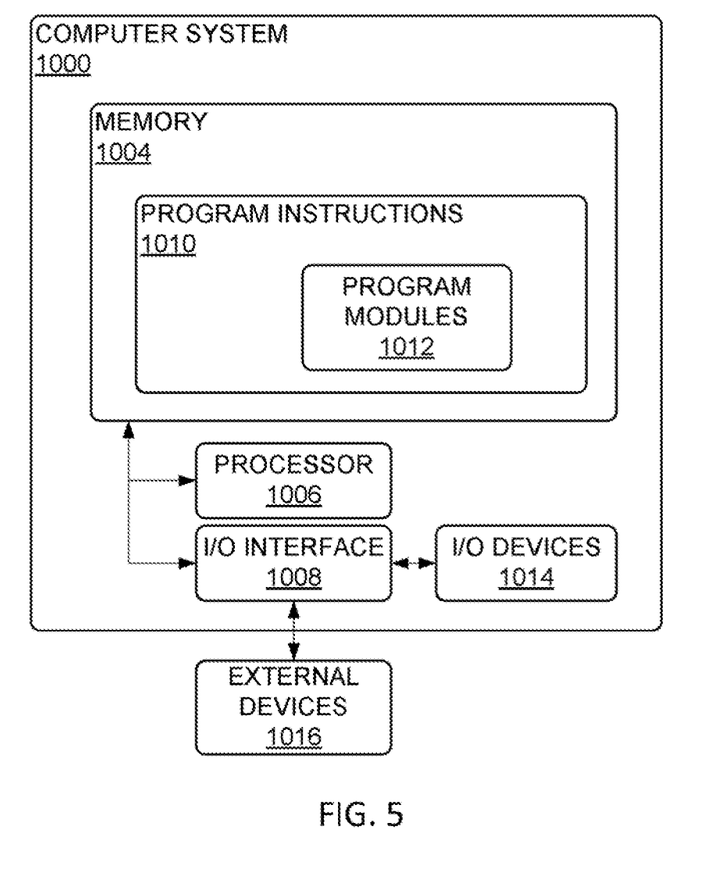
FIG. 5 is a diagram that illustrates an example computer system, in accordance with one or more embodiments.

FIG. 4 is a diagram that illustrates an example computer system (or "system") 1000 in accordance with one or more embodiments. In some embodiments, the system 1000 is a programmable logic controller (PLC). The system 1000 may include a memory 1004, a processor 1006 and an input/output (I/O) interface 1008. The memory 1004 may include non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), or bulk storage memory (for example, CD-ROM or DVD-ROM, hard drives). The memory 1004 may include a non-transitory computer-readable storage medium having program instructions 1010 stored thereon. The program instructions 1010 may include program modules 1012 that are executable by a computer processor (e.g., the processor 1006) to cause the functional operations described, such as those described with regard to the well control system 122 or the method 400.

The processor 1006 may be any suitable processor capable of executing program instructions. The processor 1006 may include a central processing unit (CPU) that carries out program instructions (e.g., the program instructions of the program modules 1012) to perform the arithmetical, logical, or input/output operations described. The processor 1006 may include one or more processors. The I/O interface 1008 may provide an interface for communication with one or more I/O devices 1014, such as a joystick, a computer mouse, a keyboard, or a display screen (for example, an electronic display for displaying a graphical user interface (GUI)). The I/O devices 1014 may include one or more of the user input devices. The I/O devices 1014 may be connected to the I/O interface 1008 by way of a wired connection (e.g., an Industrial Ethernet connection) or a wireless connection (e.g., a Wi-Fi connection). The I/O interface 1008 may provide an interface for communication with one or more external devices 1016, such as sensors, valves, pumps, motors, other computers and networks. In some embodiments, the I/O interface 1008 includes one or both of an antenna and a transceiver. In some embodiments, the external devices 1016 include a well pressure sensor, a well flowrate sensor, or a logging tool.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as examples of embodiments. Elements and materials may be substituted for those illustrated and described herein, parts and processes may be reversed or omitted, and certain features of the embodiments may be utilized independently, all as would be apparent to one skilled in the art after having the benefit of this description of the embodiments. Changes may be made in the elements described herein without departing from the spirit and scope of the embodiments as described in the following claims. Headings used herein are for organizational purposes only and are not meant to be used to limit the scope of the description.

It will be appreciated that the processes and methods described herein are example embodiments of processes and methods that may be employed in accordance with the techniques described herein. The processes and methods may be modified to facilitate variations of their implementation and use. The order of the processes and methods and the operations provided may be changed, and various elements may be added, reordered, combined, omitted, modified, and so forth. Portions of the processes and methods may be implemented in software, hardware, or a combination of software and hardware. Some or all of the portions of the processes and methods may be implemented by one or more of the processors/modules/applications described here.

As used throughout this application, the word "may" is used in a permissive sense (i.e., meaning having the potential to), rather than the mandatory sense (i.e., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the term "or" is used in an inclusive sense, unless indicated otherwise. That is, a description of an element including A or B may refer to the element including one or both of A and B. As used throughout this application, the phrase "based on" does not limit the associated operation to being solely based on a particular item. Thus, for example, processing "based on" data A may include processing based at least in part on data A and based at least in part on data B, unless the content clearly indicates otherwise. As used throughout this application, the term "from" does not limit the associated operation to being directly from. Thus, for example, receiving an item "from" an entity may include receiving an item directly from the entity or indirectly from the entity (e.g., by way of an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

What is claimed is:

1. A method of stabilizing a wellbore, the method comprising:

determining a minimum circumferential hoop stress ($\sigma\theta\theta^{MIN}$) of a cross section of a wellbore of a well drilled into a subsurface formation;

determining that the minimum circumferential hoop stress ($\sigma\theta\theta^{MIN}$) is less than or equal to a tensile strength ($T_o$) of formation rock in the cross section of the wellbore;

in response to determining that the minimum circumferential hoop stress ($\sigma\theta\theta^{MIN}$) is less than or equal to the tensile strength ($T_o$) of the formation rock:

conducting a rock fabric/textural assessment of the formation rock to determine a lamination density ($D_L$) of the formation rock;

conducting a bulk rock composition and clay fraction assessment of the formation rock to determine a composition of the formation rock;

conducting a linear swelling test to determine a linear swelling ratio (LSR) of the formation rock;

determining the following:

the lamination density ($D_L$) of the formation rock is greater than a threshold lamination density ($D_{Lthres}$);

the composition of the formation rock is a clay rich laminate defined by a bulk rock mineralogy having the following composition characteristics:

(a) the formation rock having greater than a threshold amount of swelling clays, (b) the formation rock having siliceous mudstones and muddy siltstones having greater than a threshold amount of quartz, and (c) the formation rock having greater than a threshold amount of total clay; and the LSR of the formation rock is within a specified LSR range;

in response to determining that the lamination density ($D_L$) of the formation rock is greater than a threshold lamination density ($D_{Lthres}$), the composition of the formation rock is a clay rich laminate, and the LSR of the formation rock is within the specified LSR range, determining that the formation rock is susceptible to broken-out drilling-induced fractures (BODIFs); and in response to determining that the formation rock is susceptible to broken-out drilling-induced fractures (BODIFs), operating the well to inhibit occurrence of BODIFs.

2. The method of claim 1, wherein operating the well to inhibit the occurrence of BODIFs comprises circulating, into the wellbore, oil based drilling fluids.

3. The method of claim 1, further comprising:

in response to determining that the formation rock is susceptible to BODIFs, determining a threshold drilling fluid density, wherein operating the well to inhibit the occurrence of BODIFs comprises circulating, into the wellbore, drilling fluids having a fluid density that is equal to or less than the threshold drilling fluid density.

4. The method of claim 1, wherein the bulk rock composition and clay fraction assessment of the formation rock to determine the composition of the formation rock is conducted in response to determining that the lamination density ($D_L$) of the formation rock is greater than the threshold lamination density ($D_{Lthres}$), and wherein the linear swelling test to determine the LSR of the formation rock is conducted in response to determining that the composition of the formation rock is a clay rich laminate.

5. The method of claim 1, wherein the specified LSR range is 26% to 34%.

6. The method of claim 1, further comprising:

determining a predicted height ($H_{BODIF}$) of BODIFs in the wellbore; and determining a predicted angular width ($W_{BODIF}$) of BODIFs in the wellbore, wherein operating the well to inhibit the occurrence of BODIFs comprises conducting a well operation based on the predicted height ($H_{BODIF}$) and predicted angular width ($W_{BODIF}$) of BODIFs in the wellbore.

7. The method of claim 6, wherein the predicted height ($H_{BODIF}$) of BODIFs in the wellbore is determined according to the following relationship:

$$H_{BODIF} = C \times T_{LU}$$

where C is 1 if the minimum circumferential hoop stress ($\sigma\theta\theta^{MIN}$) is a tensile stress and C is 0 if the minimum circumferential hoop stress ($\sigma\theta\theta^{MIN}$) is not a tensile stress, and $T_{LU}$ is a thickness of a layer of the formation rock having a lamination density ($D_L$) greater than the threshold lamination density ($D_{Lthres}$) and having greater than the threshold amount of swelling clays, and wherein the predicted width ($W_{BODIF}$) of BODIFs in the wellbore is determined according to the following relationship:

$$W_{BODIFs} \geq LSR \times 360/\pi r$$

where r is the radius of the wellbore and LSR is the LSR of the formation rock.

8. The method of claim 1, wherein determining the minimum circumferential hoop stress ($\sigma\theta\theta^{MIN}$) of the cross section of the wellbore is determined according to the following relationship:

$$\sigma\theta\theta^{MIN} = 3\sigma_h - \sigma_H - 2P_o - \Delta P - \sigma^{\Delta T}$$

where $\sigma_H$ is a maximum horizontal in-situ stress around the circumference of a wall of the wellbore, $\sigma_h$ is a minimum horizontal in-situ stress around the circumference of the wall of the wellbore, $\Delta P$ is a difference between a formation rock pore pressure ($P_o$) and a pressure of drilling fluid in the wellbore ($P_w$), and $\sigma^{\Delta T}$ is a thermal cooling stress of the subsurface formation.

9. The method of claim 1, wherein conducting the rock fabric/textural assessment of the formation rock to determine the lamination density ($D_L$) of the formation rock comprises conducting a transparent light optical microscopy and scanning electron microscopy (SEM) of the formation rock to determine the lamination density ($D_L$) of the formation rock.

10. The method of claim 1, wherein conducting the bulk rock composition and clay fraction assessment of the formation rock to determine the composition of the formation rock comprises conducting an X-ray diffraction to determine the composition of the formation rock.

11. The method of claim 1, wherein conducting the linear swelling test to determine the LSR of the formation rock comprises crushing, sieving and reconstituting clay fractions of the formation rock to form pellets, exposing the pellets to a water solution, and measuring linear expansion of the pellets exposed to the water solution.

12. A method comprising:

determining that a minimum circumferential hoop stress ($\sigma\theta\theta^{MIN}$) of a wellbore of a well drilled into a subsurface formation is less than or equal to a tensile strength ($T_o$) of formation rock in the wellbore;

determining that a lamination density ($D_L$) of the formation rock is greater than a threshold lamination density ($D_{Lthres}$);

determining that a composition of the formation rock is a clay rich laminate;

determining that a linear swelling ratio (LSR) of the formation rock is within a specified range; and in response to determining that the minimum circumferential hoop stress ($\sigma\theta\theta^{MIN}$) is less than or equal to the tensile strength ($T_o$) of formation rock in the wellbore, the lamination density ($D_L$) of the formation rock is greater than the threshold lamination density ($D_{Lthres}$), the composition of the formation rock is a clay rich laminate, and the LSR of the formation rock is within the specified range, operating the well to inhibit occurrence of broken-out drilling-induced fractures (BODIFs).

13. The method of claim 12, wherein determining that a composition of the formation rock is a clay rich laminate comprises determining that the formation rock has a bulk rock mineralogy having the following composition characteristics:

(a) the formation rock having greater than a threshold amount of swelling clays, (b) the formation rock having siliceous mudstones and muddy siltstones having greater than a threshold amount of quartz, and (c) the formation rock having greater than a threshold amount of total clay.

14. The method of claim 12, wherein operating the well to inhibit the occurrence of BODIFs comprises circulating, into the wellbore, oil based drilling fluids.

15. The method of claim 12, further comprising:

in response to determining that the lamination density ($D_L$) of the formation rock is greater than the threshold lamination density ($D_{Lthres}$), the composition of the formation rock is a clay rich laminate, and the LSR of the formation rock is within the specified range, determining a threshold drilling fluid density, wherein operating the well to inhibit the occurrence of BODIFs comprises circulating, into the wellbore, drilling fluids having a fluid density that is equal to or less than the threshold drilling fluid density.

16. The method of claim 12, wherein the specified LSR range is 26% to 34%.

17. The method of claim 12, further comprising:

determining a predicted height ($H_{BODIF}$) of BODIFs in the wellbore; and determining a predicted angular width ($W_{BODIF}$) of BODIFs in the wellbore, wherein operating the well to inhibit the occurrence of BODIFs comprises conducting a well operation based on the predicted height ($H_{BODIF}$) and predicted angular width ($W_{BODIF}$) of BODIFs in the wellbore.

18. The method of claim 17, wherein the predicted height ($H_{BODIF}$) of BODIFs in the wellbore is determined according to the following relationship:

$$H_{BODIF}=C \times T_{LU}$$

where C is 1 if the minimum circumferential hoop stress ($\sigma\theta\theta^{MIN}$) is a tensile stress and C is 0 if the minimum circumferential hoop stress ($\sigma\theta\theta^{MIN}$) is not a tensile stress, and $T_{LU}$ is a thickness of a layer of the formation rock having a lamination density ($D_L$) greater than the threshold lamination density ($D_{Lthres}$) and having greater than the threshold amount of swelling clays, and wherein the predicted width ($W_{BODIF}$) of BODIFs in the wellbore is determined according to the following relationship:

$$W_{BODIFs} \geq LSR \times 360/\pi r$$

where r is the radius of the wellbore and LSR is the LSR of the formation rock.

19. The method of claim 12, further comprising determining the minimum circumferential hoop stress ($\sigma\theta\theta^{MIN}$) of the cross section of the wellbore according to the following relationship:

$$\sigma\theta\theta^{MIN}=3\sigma_h\sigma_H-2P_o-\Delta P-\sigma^{\Delta T}$$

where $\sigma_H$ is a maximum horizontal in-situ stress around the circumference of a wall of the wellbore, $\sigma_h$ is a minimum horizontal in-situ stress around the circumference of the wall of the wellbore, $\Delta P$ is a difference between a formation rock pore pressure ($P_o$) and a pressure of drilling fluid in the wellbore ($P_w$), and $\sigma^{\Delta T}$ is a thermal cooling stress of the subsurface formation.

20. The method of claim 12, further comprising:

conducting a rock fabric/textural assessment of the formation rock to determine the lamination density ($D_L$) of the formation rock;

conducting a bulk rock composition and clay fraction assessment of the formation rock to determine the composition of the formation rock; and conducting a linear swelling test to determine the LSR of the formation rock.

21. The method of claim 20, wherein conducting the rock fabric/textural assessment of the formation rock to determine the lamination density ($D_L$) of the formation rock comprises conducting a transparent light optical microscopy and scanning electron microscopy (SEM) of the formation rock to determine the lamination density ($D_L$) of the formation rock.

22. The method of claim 20, wherein conducting the bulk rock composition and clay fraction assessment of the formation rock to determine the composition of the formation rock comprises conducting an X-ray diffraction to determine the composition of the formation rock.

23. The method of claim 20, wherein conducting the linear swelling test to determine the LSR of the formation rock comprises crushing, sieving and reconstituting clay fractions of the formation rock to form pellets, exposing the pellets to a water solution, and measuring linear expansion of the pellets exposed to the water solution.

24. A non-transitory computer readable storage medium comprising program instructions stored thereon that are executable by a processor to perform the following operations:

determining that a minimum circumferential hoop stress ($\sigma\theta\theta^{MIN}$) in a wellbore of a well drilled into a subsurface formation is less than or equal to a tensile strength ($T_o$) of formation rock in the wellbore;

determining that a lamination density ($D_L$) of the formation rock is greater than a threshold lamination density ($D_{Lthres}$);

determining that a composition of the formation rock is a clay rich laminate;

determining that a linear swelling ratio (LSR) of the formation rock is within a specified range; and in response to determining that the minimum circumferential hoop stress ($\sigma\theta\theta^{MIN}$) is less than or equal to the tensile strength ($T_o$) of formation rock in the wellbore, the lamination density ($D_L$) of the formation rock is greater than the threshold lamination density ($D_{Lthres}$), the composition of the formation rock is a clay rich laminate, and the LSR of the formation rock is within the specified range, operating the well to inhibit occurrence of broken-out drilling-induced fractures (BODIFs).

25. A hydrocarbon production well system, comprising:
a well system; and
a well control system configured to perform the following operations:
   determining that a minimum circumferential hoop stress ($\sigma\theta\theta^{MIN}$) in a wellbore drilled into a subsurface formation is less than or equal to a tensile strength ($T_o$) of formation rock in the wellbore;
   determining that a lamination density ($D_L$) of the formation rock is greater than a threshold lamination density ($D_{Lthres}$);
   determining that a composition of the formation rock is a clay rich laminate;
   determining that a linear swelling ratio (LSR) of the formation rock is within a specified range; and
   in response to determining that the minimum circumferential hoop stress ($\sigma\theta\theta^{MIN}$) is less than or equal to the tensile strength ($T_o$) of formation rock in the wellbore, the lamination density ($D_L$) of the formation rock is greater than the threshold lamination density ($D_{Lthres}$), the composition of the formation rock is a clay rich laminate, and the LSR of the formation rock is within the specified range, operate the well system to inhibit occurrence of broken-out drilling-induced fractures (BODIFs) in the wellbore.

* * * * *